3,321,563
PRODUCTION OF HIGHLY TRANSPARENT FILMS FROM THERMOPLASTICS
August Rettig, Kurt Schmidts, and Theodor Daur, all of Ludwigshafen (Rhine), Germany, assignors to Badische Anilin- & Soda-Fabrik Aktiengesellschaft, Ludwigshafen (Rhine), Germany
Filed Oct. 10, 1963, Ser. No. 315,283
Claims priority, application Germany, Oct. 12, 1962, B 69,203
5 Claims. (Cl. 264—95)

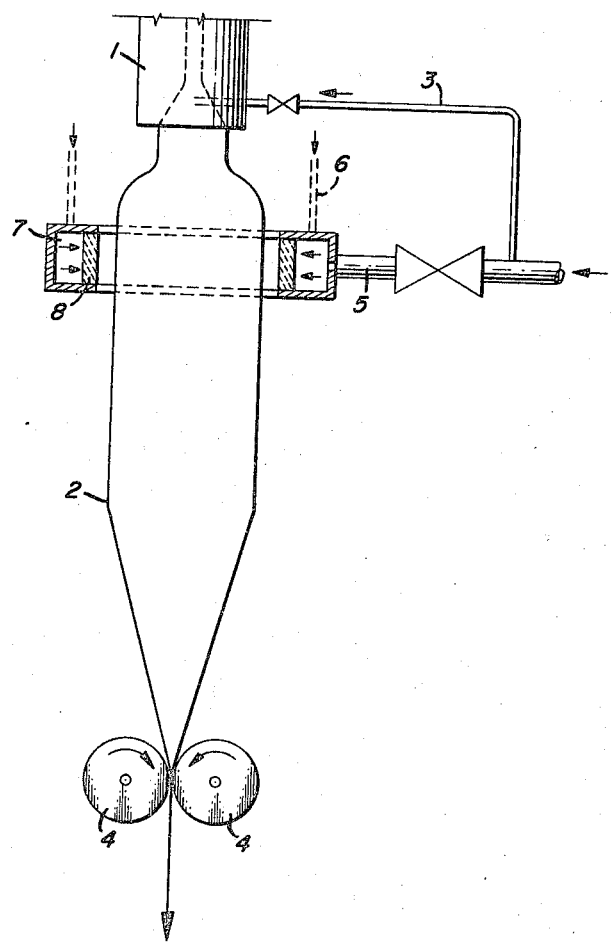

This invention relates to a process for the production of particularly transparent films from thermoplastics, particularly from isotactic polypropylene.

It is known that films can be prepared from thermoplastics by blowing an extruded tube. In this process, a thermoplastic is extruded by means of an extruder through an annular nozzle at a temperature higher than the softening point of the plastic. The tubular film obtained is blown up to the desired diameter, with simultaneous stretching in longitudinal and transverse directions, by means of air which is generally forced into the tubular film through an orifice within the annular nozzle of the extruder, the blown tubing is cooled to a temperature lower than the setting point of the thermoplastic, squeezed between a pair of rollers and taken off. When thermoplastics whose softening range is at relatively low temperatures and which exhibit little or no tendency to crystallization are used in the said prior art method, cooling of the extruded and blown up tubular film by the surrounding air is sufficient in the case of a low take-up speed of the film. In practice however the tubular film is usually cooled externally, particularly when high take-up speeds are desired. External cooling of the blown tubular film may take place for example in hollow metal cylinders, so-called former cylinders, whose inner wall, which may be coated with a textile fabric, is trickled with water. A disadvantage of this prior art method is that the film must be dried and that for blown tubular film of different dimensions, former cylinders having different diameters are required because the tubular film must constantly be in contact throughout its entire periphery with the wet wall. Another disadvantage of this prior art method is that if the tubular film is ruptured or torn, its inner face is wetted and this may lead to serious blocking.

In another prior art method, the tubular film is cooled by impingement thereon of air blown through jets or slots arranged in a circle. It is not possible to prepare clear foils by this method, however, unless the thermoplastic used is one which has a relatively low softening range and little or no tendency to crystallize. In the case of thermoplastics which have a marked tendency to crystallize and a high softening range, for example linear polyethylene and isotactic polypropylene, films are obtained having a relatively rough surface and which are cloudy or have turbid streaks parallel to the take-off direction. This cloudiness is caused by crystallization of the plastic. Generally it cannot be avoided in the case of such thermoplastics by maintaining the temperature during extrusion as closely above the softening range of the plastic as possible.

The object of the present invention is to provide a process for the production of particularly transparent films from thermoplastics, particularly from isotactic polypropylene. Other objects of the invention will be apparent to those skilled in the art from the following description. These objects are achieved according to the present invention.

We have found that highly transparent films of thermoplastics having a high tendency to crystallize, particularly of linear polyolefins, can be prepared by extruding a tubular film at temperatures above the softening point of the plastic, cooling the tubular film with a gaseous medium, inflating the tubular film and squeezing it, when the plastic in the extruder is heated to temperatures which are lower than its decomposition temperature and at least 30° C. higher than its softening point, and the tubular film which has been extruded and inflated in the conventional way is passed, in the region in which the plastic is changing from the plastic condition into the solidified condition, through a cooling zone which surrounds the tubular film annularly and in which it is bathed with a gaseous cooling medium, preferably air, which flows uniformly at low speed throughout the whole extent of the cooling zone, the speed of flow of the cooling medium and the width of the cooling zone being such that a turbid ring is observed in the tubular film in the first third of the cooling zone adjacent to the extruder and then the tube becomes clear again within the cooling zone while cooling to temperatures below the crystallization range of the plastic. The process is suitable for example for the production of films from linear polyethylene, which may be prepared by the conventional low-pressure polymerization methods, and particularly of highly transparent films from isotactic polypropylene, i.e. film-forming polypropylene, which has a fraction having isotactic structure of 85% or more and preferably has a molecular weight of 100,000 to 500,000 (determined according to Ubereither, Makromolekulare Chemie, volume 8 (1952), 21–28). When the plastic is heated in the extruder to temperatures which are lower than the decomposition temperature and at least 30° C., preferably at least 70° C., higher than the softening point of the plastic, all crystal nuclei and all crystallites in the melt are caused to disappear, probably even when the residence period in the extruder is short. Isotactic polypropylene is heated to a temperature between 190° and 320° C., preferably between 235° and 320° C., in the extruder in the process according to this invention. The crystallization range of isotactic polypropylene, for example, is from 160° to 170° C. and a tubular film of polypropylene is cooled within the cooling zone in the process according to this invention to temperatures preferably between 100° and 150° C.

Thes breadth of the cooling zone depends mainly on the temperature and thickness of the extruded film, the speed at which it is taken and the temperature, flow rate and type of gaseous cooling medium used. In the production of film 40 microns in thickness from isotactic polypropylene, the cooling zone in the process is about 5 cm. in breadth when the polypropylene is extruded at a temperature of about 220° C., the take-up speed of the tubular film is 8 m./min. and air at room temperature is used as the gasous cooling medium. Air laden with water vapour and in particular cases inert gases, such as nitrogen, may be used as the cooling medium, instead of air. The temperature of the cooling medium may in general be between about 5° and about 25° C. In the production of polypropylene film, the temperature range of 10° to 30° C. has proved to be best for the cooling medium. The cooling medium may contain water vapour. Air having a temperature between 5° and 30° C., particularly between 5° and about 15° C., is preferred for the process. Temperatures of the cooling medium below 5° C., for example 0° C., are not suitable for the process because cloudy films are then obtained. The cooling medium should flow uniformly throughout the whole region of the cooling zone and should not impinge on the surface of the tubular film in the form of sharply directed jets. The speed of flow of the cooling medium should be low and should be at least 1 m./sec.

In the production of polypropylene films having a thickness of 0.001 to 0.02 cm., the speed of flow of the cooling medium is in general from 1 to 20 m./sec. and is higher the greater the thickness of the film desired. Speeds of flow of up to about 30 m./sec. are possible but do not provide any advantage. In the first third of the cooling zone adjacent to the extruder in the process, a marked turbidity occurs extending around the entire circumference of the tubular film i.e., a turbid ring of generally about 2 to 3 cm. in width. This turbidity disappears within the cooling zone, the tubular film being cooled to temperatures lower than the crystallization range of the plastic. The tubular film is highly transparent when it leaves the cooling zone.

A uniform flow of the cooling medium in the annular cooling zone surrounding the tubular film can be achieved particularly advantageously by allowing compressed air to escape through a porous material in the direction of the tubular film. Water vapour may be supplied to the air, preferably by evaporating water in the porous material. Cooling of the gaseous cooling medium can thus be achieved without expensive cooling plant even in cases in which intense cooling is desired. The cooling medium must not be saturated with water vapour prior to pressure release. Examples of suitable porous materials are felts and other non-woven fabrics, multilayer fabrics, sponges and particularly porous ceramic materials and also materials consisting of particles of metal or plastics which have been sintered together. A material composed of bronze balls having a diameter of 1 mm. sintered together to give pores having a diameter of about 0.015 cm. has proved very suitable as the porous material. By suitable choice of the size of the pores in the porous material and of the pressure of the gaseous cooling medium, the cooling effect can be adapted to a given take-up speed and wall thickness of the tubular film.

It is advantageous to use for carrying out the process a new film-blowing apparatus comprising an extruder having an annular die, a cooling ring, air lines and squeeze rollers, in which the hollow cooling ring, provided with air supply means and if necessary with means for supplying water, is arranged in the region where the tubular film has its greatest diameter, and the wall facing its axis consists of a porous material. An example of such an apparatus is shown diagrammatically in the accompanying drawing. In the drawing, a tubular film 2 is extruded through the annular die 1 of an extruder and inflated by air which is passed in through an air line 3 and the annular die 1. The tubular film is squeezed in the conventional way by a pair of rollers 4. A hollow cooling ring 7 is provided in the region in which the tubular film 2 has its greatest diameter. The cooling ring 7 is provided with one or more supply lines 5 for air and if desired also with one or more supply lines 6 for water. The wall 8 facing the axis of the cooling ring consists of a porous ceramic material and is fitted in the annular casing of the cooling ring 7. When the apparatus is being used, a cooling medium, for example air, escapes through the wall 8 of the cooling ring 7 in the direction of the tubular film 2. The air carries out a perpendicular and laminar flow to the surface of the tubular film 2 in the width of the cooling ring 7. At the surface of the tubular film 2 it is deflected sharply upward and downward and then surrounds the tubular film as an air jacket flowing upwardly and downwardly and having a thickness of about 1 to 2 cm.

The following example will further illustrate the invention.

*Example*

Isotactic polypropylene which has an intrinsic viscosity $\eta = 2.6$ is heated to 250° C. in an extruder and extruded through an annular die having a diameter of 120 mm. The extruded tubular film is inflated with air to a diameter of 250 mm., squeezed in the conventional way by a pair of rollers and taken up at a speed of 10 m./min. The tubular film is cooled in a cooling zone which surrounds the tubular film in the region where it has reached the diameter of 250 mm. A cooling ring is used which has a diameter of 300 mm., a height of 50 mm. and a wall of porous ceramic material on the inner side having a thickness of 30 mm. Air at 1.65 atm. gauge and a temperature of 20° C. escapes through the cooling ring at the rate of 162 cubic meters (S.T.P.) per hour. The temperature of the air falls by 3° C. during its expansion. The polypropylene film becomes cloudy in the first third of the cooling zone nearer to the extruder and leaves the cooling zone as a highly transparent film having an amount of scattering of only 15%.

If the tubular film is cooled merely by the ambient air, without any additional cooling means, a polypropylene film is obtained which has an amount of scattering of about 80%.

We claim:

1. A process for production of polypropylene films which comprises extruding from a die a tube of polypropylene at a temperature below its decomposition point and above at least 30° C. above its softening point, inflating the tube as it emerges from the die and thereby enlarging its diameter, applying against the outer side of the inflated tube in the region of the zone in which said inflated tube reaches its largest inflated diameter a cooling band of a gaseous medium having a temperature about 5° C. to 30° C., and forming by the cooling of said inflated tube by said cooling band a turbid ring in the one third portion of said cooling band nearest said die, which turbid ring disappears as said inflating tube passes further through said cooling band.

2. A process as claimed in claim 1 wherein said polypropylene is extruded at a temperature in the range of 190–320° C. and said inflated polypropylene tube is cooled to a temperature in the range of 100–150° C. in said cooling band.

3. A process as claimed in claim 1 wherein said cooling band is provided by discharging at low velocity air toward said tube through a ring of porous material surrounding said inflated tube in the region of said zone.

4. A process as claimed in claim 3 wherein said ring of porous material is a ceramic ring.

5. A process as claimed in claim 3 wherein said air has water vapor added thereto.

References Cited by the Examiner

UNITED STATES PATENTS

| | | | |
|---|---|---|---|
| 2,955,321 | 10/1960 | Fortner et al. | 18—14 X |
| 2,966,700 | 1/1961 | Dyer et al. | 18—14 X |
| 2,987,767 | 6/1961 | Berry et al. | 18—14 |
| 3,207,823 | 9/1965 | Glyde et al. | 18—14 |
| 3,217,073 | 11/1965 | Olson et al. | 264—210 X |
| 3,223,764 | 12/1965 | Kahn et al. | 264—210 X |
| 3,226,459 | 12/1965 | Tijunelis | 264—210 X |

FOREIGN PATENTS 853,745 11/1960 Great Britain.

ROBERT F. WHITE, *Primary Examiner.*

L. S. SQUIRES, A. R. NOE, *Assistant Examiners.*